(12) United States Patent
Yoo et al.

(10) Patent No.: US 10,320,700 B2
(45) Date of Patent: Jun. 11, 2019

(54) APPARATUS FOR MANAGING OPTIMIZED ASSET OF DISTRIBUTED RESOURCES AND OPERATION METHOD OF THE SAME

(71) Applicant: Electronics and Telecommunications Research Institute, Daejeon (KR)

(72) Inventors: Yoon-Sik Yoo, Daejeon (KR); Il Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 128 days.

(21) Appl. No.: 15/400,495

(22) Filed: Jan. 6, 2017

(65) Prior Publication Data

US 2017/0201464 A1 Jul. 13, 2017

(30) Foreign Application Priority Data

Jan. 7, 2016 (KR) .................. 10-2016-0001906

(51) Int. Cl.
*G06F 15/173* (2006.01)
*H04L 12/911* (2013.01)
(Continued)

(52) U.S. Cl.
CPC ............. *H04L 47/70* (2013.01); *G06Q 50/06* (2013.01); *H02J 3/00* (2013.01); *H02J 3/14* (2013.01); *H02J 3/382* (2013.01); *H02J 13/0086* (2013.01); *H04L 47/822* (2013.01); *H04L 67/10* (2013.01); *H04L 67/125* (2013.01); *H04L 67/36* (2013.01); *H02J 2003/001* (2013.01); *H02J 2003/007* (2013.01); *Y02B 70/3225* (2013.01); *Y02E 40/72* (2013.01); *Y02E 60/76* (2013.01);
(Continued)

(58) Field of Classification Search
CPC ....... H04L 47/70; H04L 47/822; H04L 67/10; H04L 67/36; H04L 67/125; H04L 12/911; H04L 29/08; G06Q 50/06; H02J 3/00; H02J 3/14; H02J 3/382; H02J 13/0086; H02J 2003/001; H02J 2003/007; Y02B 70/3225; Y02E 40/72; Y02E 60/76; Y04S 10/123; Y04S 20/222; Y04S 40/22; Y04S 40/18

See application file for complete search history.

(56) References Cited

U.S. PATENT DOCUMENTS

2004/0044442 A1* 3/2004 Bayoumi .................. H02J 3/00
   700/286
2006/0047369 A1* 3/2006 Brewster ................ G06Q 10/00
   700/291
(Continued)

FOREIGN PATENT DOCUMENTS

KR 20140095839 A 8/2014
KR 20150124023 A 11/2015

*Primary Examiner* — Cheikh T Ndiaye
(74) *Attorney, Agent, or Firm* — William Park & Associates Ltd.

(57) ABSTRACT

Disclosed is an optimized asset management apparatus and an operation method thereof, the method including transmitting a request for state information of distributed resources to resource aggregators, receiving the state information of the distributed resources from the resource aggregators, analyzing the state information of the distributed resources, and registering at least one distributed resource among the distributed resources as an optimized asset based on a result of the analyzing.

14 Claims, 5 Drawing Sheets

(51) Int. Cl.
*H04L 29/08* (2006.01)
*G06Q 50/06* (2012.01)
*H02J 3/00* (2006.01)
*H02J 3/14* (2006.01)
*H02J 3/38* (2006.01)
*H02J 13/00* (2006.01)

(52) U.S. Cl.
CPC ............ *Y04S 10/123* (2013.01); *Y04S 20/222* (2013.01); *Y04S 40/18* (2018.05); *Y04S 40/22* (2013.01)

(56) References Cited

U.S. PATENT DOCUMENTS

| | | | |
|---|---|---|---|
| 2008/0281663 A1* | 11/2008 | Hakim | B60L 11/1824 705/7.25 |
| 2009/0093916 A1* | 4/2009 | Parsonnet | F24F 5/0017 700/286 |
| 2010/0217651 A1* | 8/2010 | Crabtree | G06Q 10/00 705/7.22 |
| 2012/0166630 A1 | 6/2012 | Cho et al. | |
| 2014/0277808 A1* | 9/2014 | Irisarri | G05B 15/02 700/295 |
| 2015/0220099 A1 | 8/2015 | Yoo et al. | |
| 2015/0261892 A1 | 9/2015 | Bozchalui et al. | |

\* cited by examiner

APPARATUS FOR MANAGING OPTIMIZED ASSET OF DISTRIBUTED RESOURCES AND OPERATION METHOD OF THE SAME

CROSS-REFERENCE TO RELATED APPLICATION(S)

This application claims the priority benefit of Korean Patent Application No. 10-2016-0001906 filed on Jan. 7, 2016, in the Korean Intellectual Property Office, the disclosure of which is incorporated herein by reference for all purposes.

BACKGROUND

1. Field

One or more example embodiments relate to an apparatus for managing an optimized asset of distributed resources and an operation method of the apparatus.

2. Description of Related Art

In general, when a power system is unable to provide energy, some buildings or regions may install power generation resources locally to autonomously supply and receive energy.

Typically, distributed energy resources may be provided in a form of power generation facilities installed locally for independent development and energy supply so as to be used as a major energy supply source in an emergency case.

However, in general distributed energy resource management technology, there has a problem that systematic and optimized distributed resources that can be readily used at the time of power peak or emergency are not managed as distributed resource assets.

In particular, setting management modeling profile suitable for each of distributed energy resources installed in a large area and a heterogeneous distributed energy resource, and directly setting and porting to distributed resource control system one by one at a venue is reaching the limit of efficient management of distributed energy resources.

Accordingly, there is a desire for an enhanced distributed resource management infrastructure that is obtained by remotely configuring and setting the distributed resources to manage the distributed energy resources as systematic and hierarchical form of energy development resources.

SUMMARY

An aspect provides an optimized asset management system for monitoring states of distributed energy resources in real time, remotely managing distributed resource profile information, and efficiently managing the distributed energy resources such that an available distributed resource immediately responses to a power peak or emergency, and an operation method thereof.

According to an aspect, there is provided a method of operating an optimized asset management apparatus, the method including transmitting a request for state information of distributed resources to resource aggregators, receiving the state information of the distributed resources from the resource aggregators, analyzing the state information of the distributed resources, and registering at least one distributed resource among the distributed resources as an optimized asset based on a result of the analyzing.

A resource state of the distributed resources may correspond to at least one of an environment setting, modeling information, network information, attribute information, or logic node information of the distributed resources.

The analyzing may include analyzing the state information of the distributed resources and verifying a location, a degree of response, and an availability of each of the distributed resources.

The registering may includes calculating a distributed resource that is optimized based on the location, the degree of response, and the availability among the distributed resources, and registering the calculated distributed resource as the optimized asset.

The calculating may include calculating a distance from a supply-and-demand region with respect to the distributed resources, and verifying whether the availability is greater than zero with respect to the distributed resources.

The method may further include periodically transmitting the request for the state information of the distributed resources to the resource aggregators, and receiving, when the distributed resources include a distributed resource of which state information is changed, the changed state information of the distributed resource.

The resource aggregators may inquire about a resource state of each of the distributed resources and receive the resource state.

The method may further include sending a responding request to the optimized asset, and receiving a response to the responding request from the optimized asset.

The method may further include managing history information including whether an immediate response is available and a location of the optimized asset.

According to another aspect, there is also provided an apparatus for managing an optimized asset, the apparatus including a communicator configured to transmit a request for state information of distributed resources to resource aggregators and receive the state information of the distributed resources from the resource aggregators, an analyzer configured to analyze the state information of the distributed resources, and a registerer configured to register at least one distributed resource among the distributed resources as an optimized asset based on a result of the analyzing.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
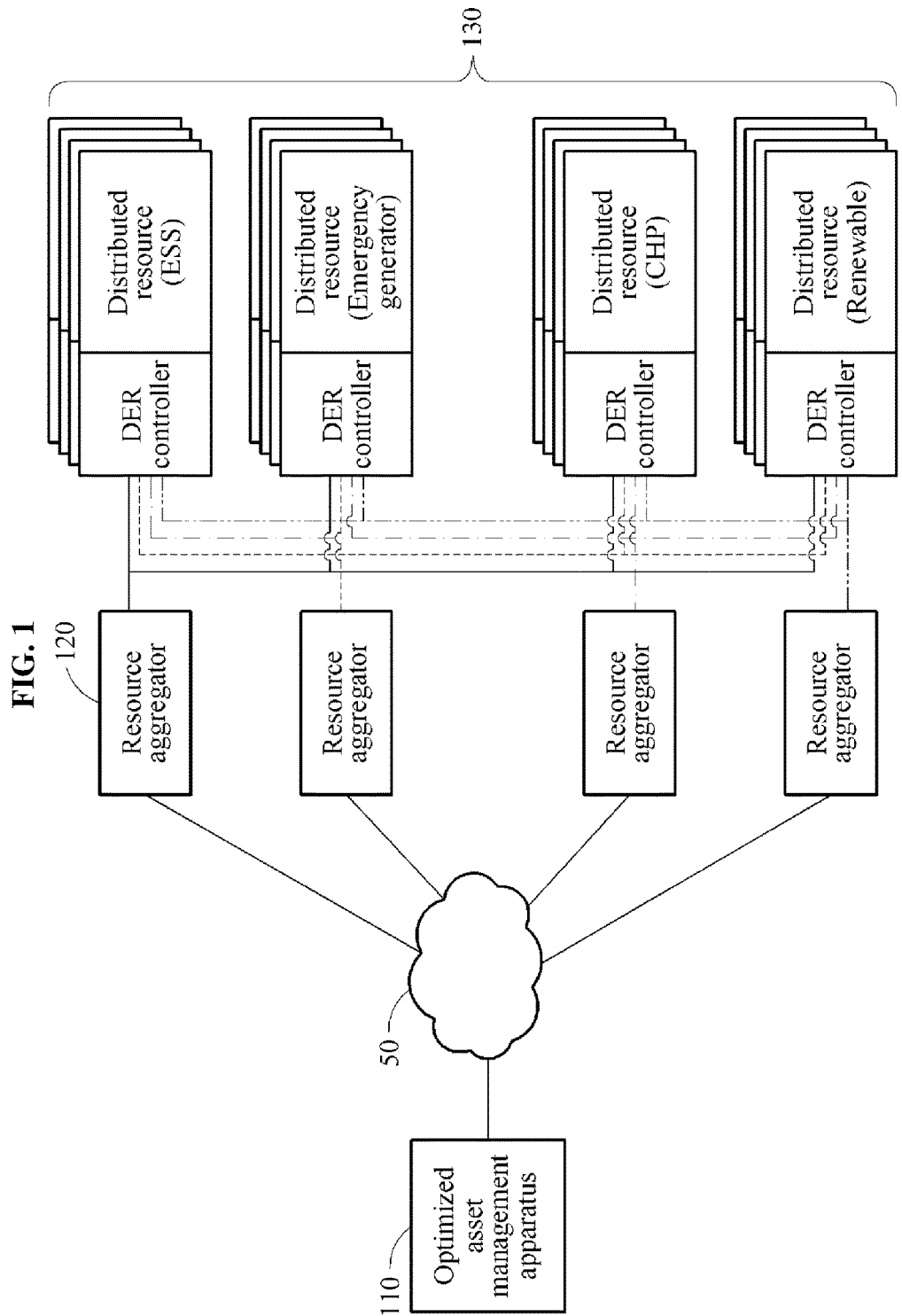
FIG. 1 is a diagram illustrating a system including an optimized asset management apparatus according to an example embodiment.

Hereinafter, some example embodiments will be described in detail with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following example embodiments are to provide a method of managing pre-installed distributed resources and changed distributed resources as an available optimized asset to use distributed energy resources as virtual development resources.

FIG. 1 is a diagram illustrating a system including an apparatus for managing an optimized asset according to an example embodiment. Hereinafter, the apparatus for managing an optimized asset may also be referred to as, for example, an optimized asset management apparatus.

A structure of the system of FIG. 1 may be a structure for automatically configure distributed resources. In a case of an emergency or an electricity peak of a consumer, a system of configuring and managing distributed resources using an optimized asset available for a real-time response may be provided to the consumer.

The system may include an optimized asset management apparatus 110 and at least one resource aggregator 120. The resource aggregator 120 may monitor a plurality of distributed energy resources (DER) 130 and verify states of the distributed energy resources 130. Hereinafter, the distributed energy resources 130 may also be referred to as distributed resources 130.

The optimized asset management apparatus 110 may transmit a request for state information of the distributed resources 130 to the resource aggregator 120, receive information including a changed environment of the distributed resources 130, response history information, and a location of distributed resources 130 from the resource aggregator 120, and manage the state of the distributed resources 130. When at least one distributed resource among the distributed resources 130 is changed, the optimized asset management apparatus 110 may generate a changed profile of the corresponding distributed resource, manage the changed profile, and store a history thereof. Through this, the optimized asset management apparatus 110 may manage the distributed resources 130 as an optimized asset so as to immediately respond to a request for energy supply.

When profiled modeling information is received, the resource aggregator 120 may manage the states of the distributed resources 130 based on the modeling information. For example, when a state of at least one distributed resource among the distributed resources 130 is changed, the resource aggregator 120 may remotely transmit information on the changed state to the optimized asset management apparatus 110.

Based on the foregoing, a method of efficiently automating distributed resources and managing the distributed resources may be provided. As shown in the drawing, the optimized asset management apparatus 110 and the resource aggregator 120 may manage the states of the distributed resources 130 through an Internet network 50. Depending on examples, a different network may be connected for each resource aggregator. Each of the distributed resources 130 may be controlled by a DER controller.

Figure 2:
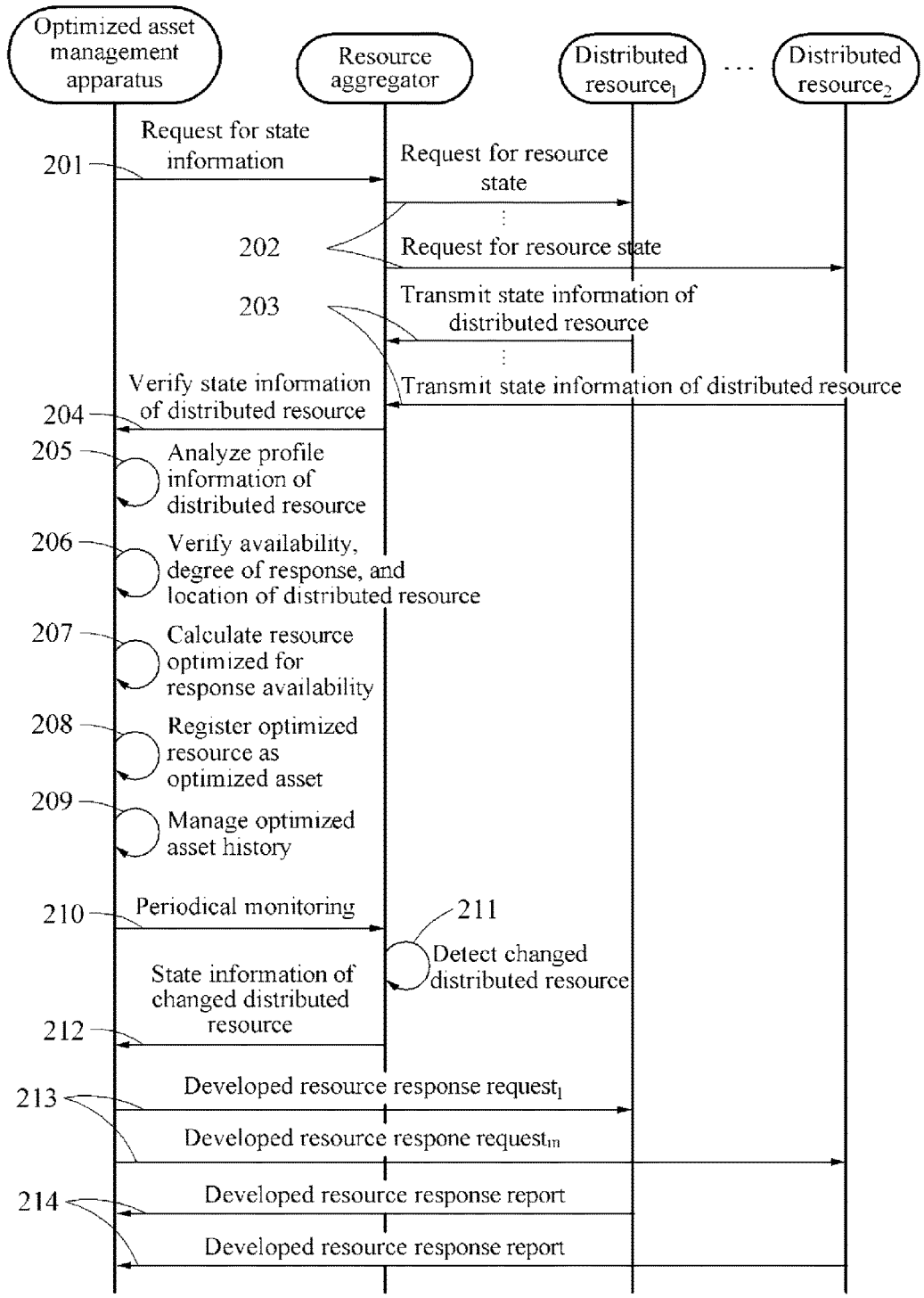
FIG. 2 is a diagram illustrating an operation of a system including an optimized asset management apparatus according to an example embodiment.

FIG. 2 is a diagram illustrating an operation of a system including an optimized asset management apparatus according to an example embodiment.

In operation 201, an optimized asset management apparatus may transmit a request for state information of distributed resources to a resource aggregator.

The optimized asset management apparatus may send a connection request to the resource aggregator through a wired or wireless network so as to be connected to the resource aggregator.

In operation 202, the resource aggregator may send a request for a resource state to the distributed resources.

The request for the resource state may be send to each of the distributed resources connected to the resource aggregator. The resource state may correspond to, for example, an environment setting, modeling information, network information, attribute information, and logic node information. The request for the resource state may include an inquiry about whether a changed item is included in the resource state. The request for the resource state may be sent to the DER controller of each of the distributed resources.

In operation 203, the resource aggregator may receive the state information from the distributed resources connected thereto.

The state information may be received from the DER controller of each of the distributed resources. For example, the state information may be received from a distributed resource having changed state information among the distributed resources, each having received the request for the resource state. The state information may also be received from a distributed resource of which state information is not changed.

In operation 204, the resource aggregator may request the optimized asset management apparatus to verify the state information of the distributed resources.

In this example, among the distributed resources having received the request for the state information, the state information received from the distributed resource of which the state information is changed may be transmitted as a response to the request for the state information transmitted in operation 201.

In operation 205, the optimized asset management apparatus may analyze profile information of the distributed resources.

The optimized asset management apparatus may analyze whether changed profile information is included in the received state information. For example, the optimized asset management apparatus may identify changed information with respect to the environment setting, the modeling information, the network information, the attribute information, and the logic node information.

In operation 206, the optimized asset management apparatus may verify an availability, a degree of response, and a location of the distributed resources.

Depending on examples, information on the availability, the degree of response, and the location may be included in the profile information of the distributed resources.

In operation 207, the optimized asset management apparatus may calculate an optimized resource optimized for a response availability.

In the present example, the optimized resource may indicate a distributed resource optimized for an immediate response among the distributed resources. The optimized asset management apparatus may calculate an optimized resource satisfying the following equation.

$$\max_{\substack{x_1 \le g_1(x) \\ x_2 \le g_2(x) \\ \ldots}} f(x), h_a(x) > 0 \qquad \text{[Equation]}$$

In the above equation, $f(x)$ denotes an object function used for obtaining the optimized resource. $x_1$ denotes a location variable and $g_1(x)$ denotes a distance from a distributed resource located closest to a supply-and-demand region. Also, $x_2$ denotes a response variable and $g_2(x)$ denotes a maximum availability of the distributed resource. $h_a(x)$ denotes an availability, and may be used to extract a distributed resource satisfying a condition that the distributed resource is greater than 0.

In operation 208, the optimized asset management apparatus may register the optimized resource calculated in operation 207 as an optimized asset.

In operation 209, the optimized asset management apparatus may manage an optimized asset history.

Attribute information of the distributed resources may be managed, information on a location of the optimized asset, whether an immediate response is available, and the optimized asset may be registered in a history table, and the information may be managed such that the optimized distributed resources are updated with the optimized asset.

In operation 210, the optimized asset management apparatus may periodically request the resource aggregator to perform monitoring. To this end, a network interface used for state information monitoring and communication may be provided.

In operation 211, the resource aggregator may detect a changed distributed resource.

A request for the state information of the distributed resources may be periodically sent to the distributed resources being in a wireless connection. In response to the request, changed state information of the distributed resources may be received from the resource aggregator. Through this, changed distributed resources may be detected.

In operation 212, the resource aggregator may transmit the state information of the changed distributed resource to the optimized asset management apparatus.

In operation 213, the optimized asset management apparatus may transmit a developed resource response request to the optimized asset.

In response to the registered optimized asset, a response request may be transmitted to the optimized asset optimized to the location, the degree of response, and the availability among the distributed resources.

In operation 214, the optimized asset management apparatus may transmit a report about the developed resource request from the optimized asset in response to the response request. For example, the report about the developed resource response request may include a confirming response indicating that a developed resource is operated.

Figure 3:
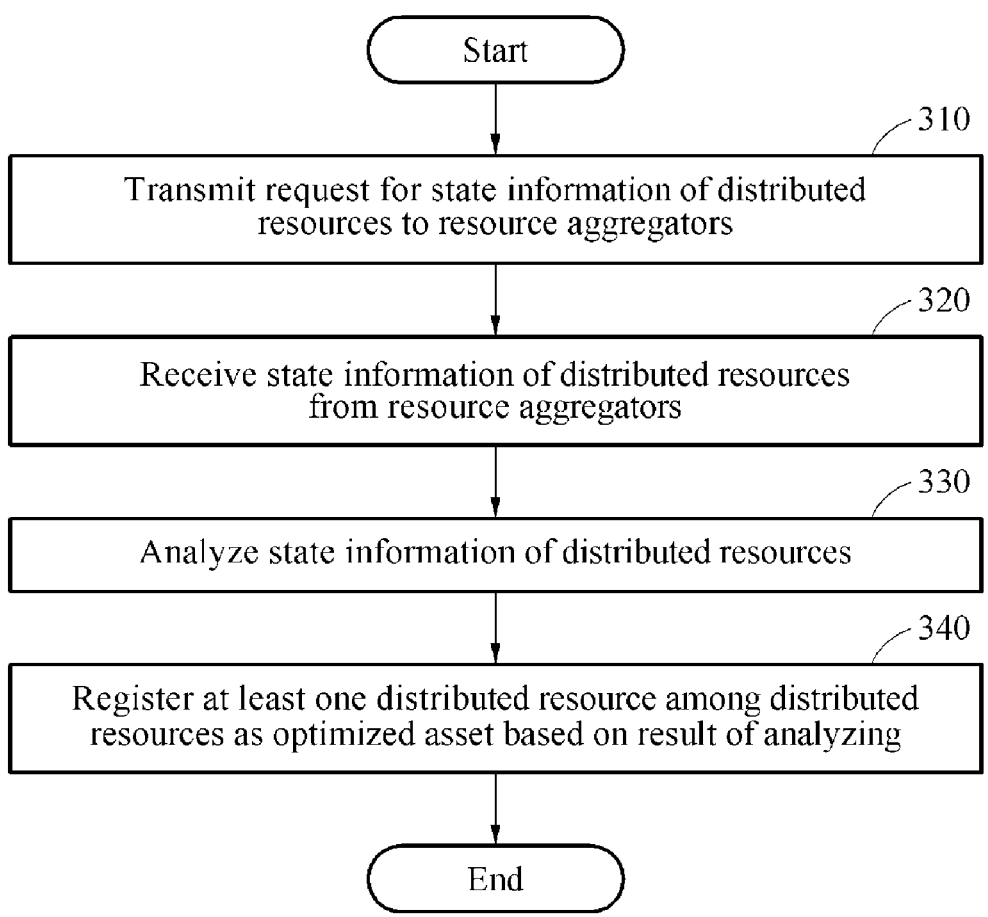
FIG. 3 is a flowchart illustrating an operation of an optimized asset management apparatus according to an example embodiment.

FIG. 3 is a flowchart illustrating an operation of an optimized asset management apparatus according to an example embodiment.

In operation 310, an optimized asset management apparatus may transmit a request for state information of distributed resources to resource aggregators.

In this example, the request for the state information of the distributed resources may be transmitted to a resource aggregator that is remotely connected through a wired and wireless network.

The resource aggregator may send a request for a resource state to each of the distributed resources connected to the resource aggregator. The resource state may correspond to, for example, an environment setting, modeling information, network information, attribute information, and logic node information. The request for the resource state may include an inquiry about whether the resource state is changed.

In operation 320, the optimized asset management apparatus may receive the state information of the distributed resources from the resource aggregators.

Among the distributed resources having transmitted the request for the resource state, state information of a distributed resource of which the state information is changed may be received as a response to the request for the state information.

In operation 330, the optimized asset management apparatus may analyze the state information of the distributed resources.

In this example, whether changed profile information is included in the received state information may be analyzed. For example, changed information among an environment setting, modeling information, network information, attribute information, and logic node information may be verified.

The optimized asset management apparatus may calculate an optimized resource optimized for a response availability. The optimized asset management apparatus may calculate an optimized resource satisfying the following equation among the distributed resources.

$$\max_{\substack{x_1 \le g_1(x) \\ x_2 \le g_2(x) \\ \ldots}} f(x), h_a(x) > 0 \qquad \text{[Equation]}$$

In the above equation, $f(x)$ denotes an object function used for obtaining the optimized resource. $x_1$ denotes a location variable and $g_1(x)$ a distance from a distributed resource located closest to a supply-and-demand region. Also, $x_2$ denotes a response variable and $g_2(x)$ denotes a maximum availability of the distributed resource. $h_a(x)$ denotes an availability, and may be used to extract a distributed resource satisfying a condition that the distributed resource is greater than 0.

In operation 340, the optimized asset management apparatus may register at least one distributed resource among the distributed resources as an optimized asset based on a result of the analyzing.

The optimized asset calculated using the above equation may be registered. Also, attribute information of the distributed resources may be managed, information on a location of the optimized asset, whether an immediate response is available, and the optimized asset may be registered in a history table, and the information may be managed such that the optimized distributed resources are updated with the optimized asset.

The optimized asset management apparatus may periodically request the resource aggregator to perform monitoring. To this end, a network interface used for state information monitoring and communication may be provided. In this example, a request for the monitoring may be periodically sent to the resource aggregators being in a wireless connection. In response to the request, changed state information of the distributed resources collected from the resource aggregators may be received. Through this, changed distributed resources may be detected.

Figure 4:
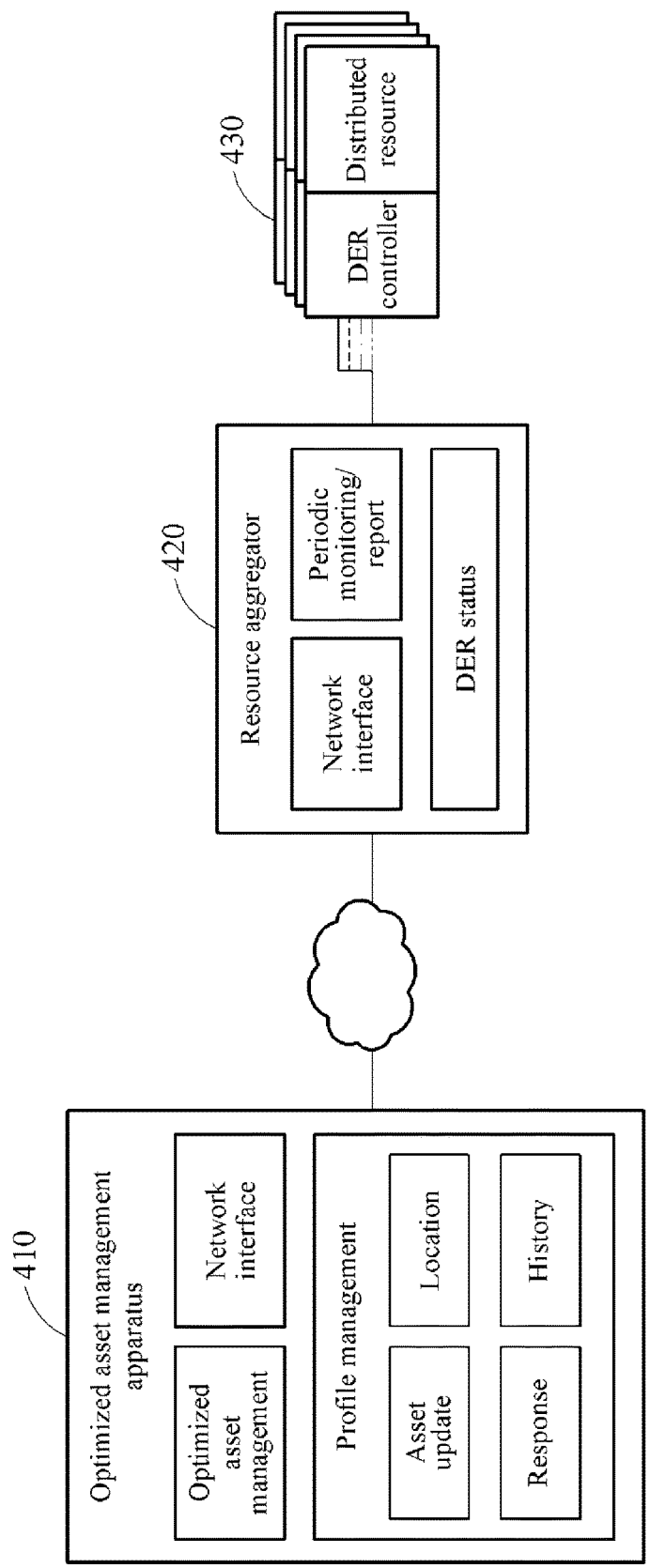
FIG. 4 is a diagram illustrating an example of managing an asset optimized to an immediate response of distributed resources according to an example embodiment.

FIG. 4 is a diagram illustrating an example of managing an asset optimized to an immediate response of distributed resources according to an example embodiment.

An optimized asset management apparatus 410 may provide an optimized asset managing function for managing distributed resources optimized for an immediate response as an asset and a profile managing function for managing distributed resources to be an optimized asset.

The optimized asset may be registered based on a condition whether a location is close to a supply-and-demand region, a condition related to a degree of response, and a condition whether a maximal availability of a distributed resource is greater than 0.

The optimized asset management apparatus 410 may manage attribute information of the distributed resources, and manage a location of the optimized asset, whether an immediate response is available, and history information used for registration as the optimized asset such that the optimized distributed resources are updated with the optimized asset.

Also, a network interface used for periodical communication and monitoring of state information of the distributed resources may be provided.

A resource aggregator 420 may monitor states of distributed resources 430. In response to a change in the states, the resource aggregator 420 may update the states, include a DER status for detecting a changed state, and provide a network interface function for transmitting state information and a periodical monitoring and reporting function.

Figure 5:
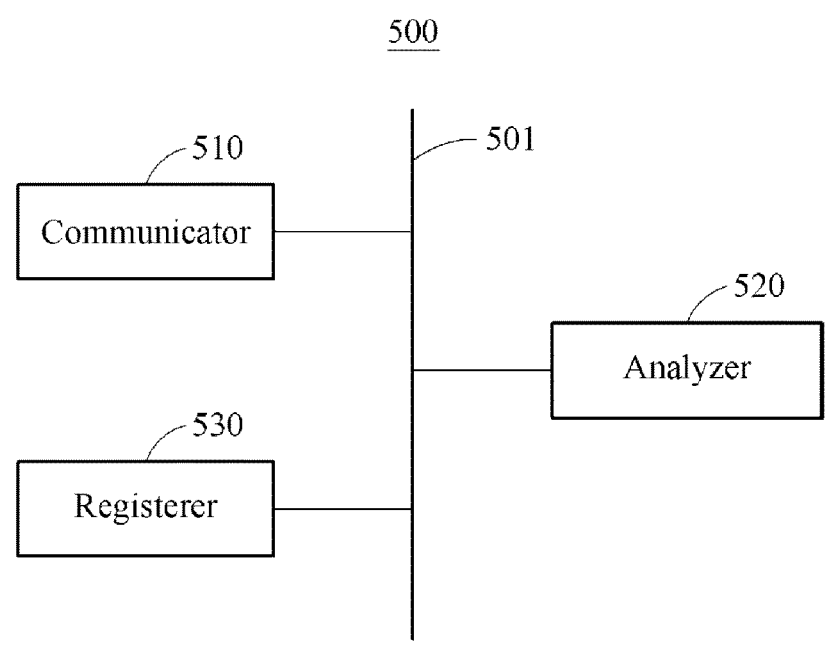
FIG. 5 is a block diagram illustrating an optimized asset management apparatus according to an example embodiment.

FIG. 5 is a block diagram illustrating an optimized asset management apparatus according to an example embodiment. An optimized asset management apparatus 500 may include a communicator 510, an analyzer 520, and a registerer 530.

The communicator 510 may transmit a request for state information of distributed resources to resource aggregators.

In this example, the request for the state information of the distributed resources may be transmitted to a resource aggregator that is remotely connected through a wired and wireless network.

The resource aggregator may send a request for a resource state to each of the distributed resources connected to the resource aggregator. The resource state may correspond to, for example, an environment setting, modeling information, network information, attribute information, and logic node information. The request for the resource state may include an inquiry about whether the resource state is changed.

The communicator 510 may receive the state information of the distributed resources from the resource aggregators.

Among the distributed resources having transmitted the request for the resource state, state information of a distributed resource of which the state information is changed may be received as a response to the request for the state information.

The analyzer 520 may analyze the state information of the distributed resources.

In this example, whether changed profile information is included in the received state information may be analyzed. For example, changed information among an environment setting, modeling information, network information, attribute information, and logic node information may be verified.

The optimized asset management apparatus 500 may calculate an optimized resource optimized for a response availability. The optimized asset management apparatus may calculate an optimized resource satisfying the following equation among the distributed resources.

$$\max_{\substack{x_1 \leq g_1(x) \\ x_2 \leq g_2(x) \\ \ldots}} f(x), h_a(x) > 0 \qquad \text{[Equation]}$$

In the above equation, $f(x)$ denotes an object function used for obtaining the optimized resource. $x_1$ denotes a location variable and $g_1(x)$ a distance from a distributed resource located closest to a supply-and-demand region. Also, $x_2$ denotes a response variable and $g_2(x)$ denotes a maximum availability of the distributed resource. $h_a(x)$ denotes an availability, and may be used to extract a distributed resource satisfying a condition that the distributed resource is greater than 0.

The registerer 530 may register at least one distributed resource among the distributed resources as an optimized asset based on a result of the analyzing.

The optimized asset calculated using the above equation may be registered. Also, attribute information of the distributed resources may be managed, information on a location of the optimized asset, whether an immediate response is available, and the optimized asset may be registered in a history table, and the information may be managed such that the optimized distributed resources are updated with the optimized asset.

The optimized asset management apparatus 500 may periodically request the resource aggregator to perform monitoring. To this end, a network interface used for state information monitoring and communication may be provided. In this example, a request for the monitoring may be periodically sent to the resource aggregators being in a wireless connection. In response to the request, changed state information of the distributed resources collected from the resource aggregators may be received. Through this, changed distributed resources may be detected.

According to an aspect, it is possible to provide an optimized asset management apparatus for efficiently and hierarchically managing distribution-demanded resources in a case of power peak or emergency, registering and managing an immediate response available resource to be an optimized asset to ensure real-time energy demand and supply, monitoring the distributed resource in real time to provide notification on a change in the distributed resource when a state of a developed resource is updated or changed, managing a history thereof, and efficiently and stably managing the distributed resources as the optimized asset.

According to another aspect, it is possible to provide a system and method of managing virtual distributed energy resources as an optimized asset. Also, to use distributed energy resources to be virtual developed resources, a system and method of managing pre-installed distributed resources and changed distributed resources as an optimized asset is also provided.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts.

Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of operating an optimized asset management apparatus, the method comprising:
   transmitting, by the optimized asset management apparatus, a request for state information of distributed resources to resource aggregators;
   receiving, by the optimized asset management apparatus, the state information of the distributed resources from the resource aggregators;
   analyzing, by the optimized asset management apparatus, the state information of the distributed resources; and
   registering, by the optimized asset management apparatus, at least one distributed resource among the distributed resources as an optimized asset based on a result of the analyzing,
   wherein the at least one distributed resource is optimized for an immediate response among the distributed resources and satisfies the following equation:

$$\max_{\substack{x_1 \leq g_1(x) \\ x_2 \leq g_2(x)}} f(x), h_a(x) > 0$$

wherein f(x) denotes an object function used for obtaining the optimized resource, $x_1$ denotes a location variable and $g_{1(x)}$ denotes a distance from a distributed resource located closest to a supply-and-demand region, $x_2$ denotes a response variable, $g_{2(x)}$ denotes a maximum availability of the distributed resource, and $h_{a(x)}$ denotes an availability.

2. The method of claim 1, wherein a resource state of the distributed resources corresponds to at least one of an environment setting, modeling information, network information, attribute information, or logic node information of the distributed resources.

3. The method of claim 1, wherein the analyzing includes:
analyzing, by the optimized asset management apparatus, the state information of the distributed resources and verifying a location, a degree of response, and an availability of each of the distributed resources.

4. The method of claim 3, wherein the registering includes:
calculating, by the optimized asset management apparatus, a distributed resource that is optimized based on the location, the degree of response, and the availability among the distributed resources; and
registering, by the optimized asset management apparatus, the calculated distributed resource as the optimized asset.

5. The method of claim 4, wherein the calculating program code includes:
calculating, by the optimized asset management apparatus, a distance from a supply-and-demand region with respect to the distributed resources; and
verifying, by the optimized asset management apparatus, whether the availability is greater than zero with respect to the distributed resources.

6. The method of claim 1, further comprising:
transmitting, by the optimized asset management apparatus, the request for the state information of the distributed resources to the resource aggregators; and
receiving, by the optimized asset management apparatus, when the distributed resources include a distributed resource of which state information is changed, the changed state information of the distributed resource.

7. The method of claim 1, wherein the resource aggregators inquire about a resource state of each of the distributed resources and receive the resource state.

8. The method of claim 1, further comprising:
sending, by the optimized asset management apparatus, a responding request to the optimized asset; and
receiving, by the optimized asset management apparatus, a response to the responding request from the optimized asset.

9. The method of claim 1, further comprising: managing, by the optimized asset management apparatus, history information including whether an immediate response is available and a location of the optimized asset.

10. An apparatus for managing an optimized asset, the apparatus comprising:
a non-transitory computer readable storage media storing computer executable program code; and
one or more processors that process the computer executable program code comprising:
communicator program code that communicates history a request for state information of distributed resources to resource aggregators and receives the state information of the distributed resources from the resource aggregators;
analyzer program code that analyzes history the state information of the distributed resources; and
registerer program code that registers history at least one distributed resource among the distributed resources as an optimized asset based on a result of the analyzing,
wherein the at least one distributed resource is optimized for an immediate response among the distributed resources and satisfies the following equation:

$$\max_{\substack{x_1 \leq g_1(x) \\ x_2 \leq g_2(x)}} f(x), h_a(x) > 0$$

wherein f(x) denotes an object function used for obtaining the optimized resource, $x_1$ denotes a location variable and $g_{1(x)}$ denotes a distance from a distributed resource located closest to a supply-and-demand region, $x_2$ denotes a response variable, $g_{2(x)}$ denotes a maximum availability of the distributed resource, and ha(x) denotes an availability.

11. The apparatus of claim 10, wherein the analyzer program code analyzes the state information of the distributed resources and verifies a location, a degree of response, and an availability of each of the distributed resources.

12. The apparatus of claim 11, wherein the computer executable program code further comprises program code that calculates a distance from a supply-and-demand region with respect to the distributed resources, and that verifies whether the availability is greater than zero with respect to the distributed resources.

13. The apparatus of claim 11, wherein the registerer program code calculates a distributed resource that is optimized based on the location, the degree of response, and the availability among the distributed resources, and registers the calculated distributed resource as the optimized asset.

14. The apparatus of claim 10, wherein the resource aggregators comprise program code that inquires about a resource state of each of the distributed resources and that receives the resource state.

* * * * *